Figure 1:
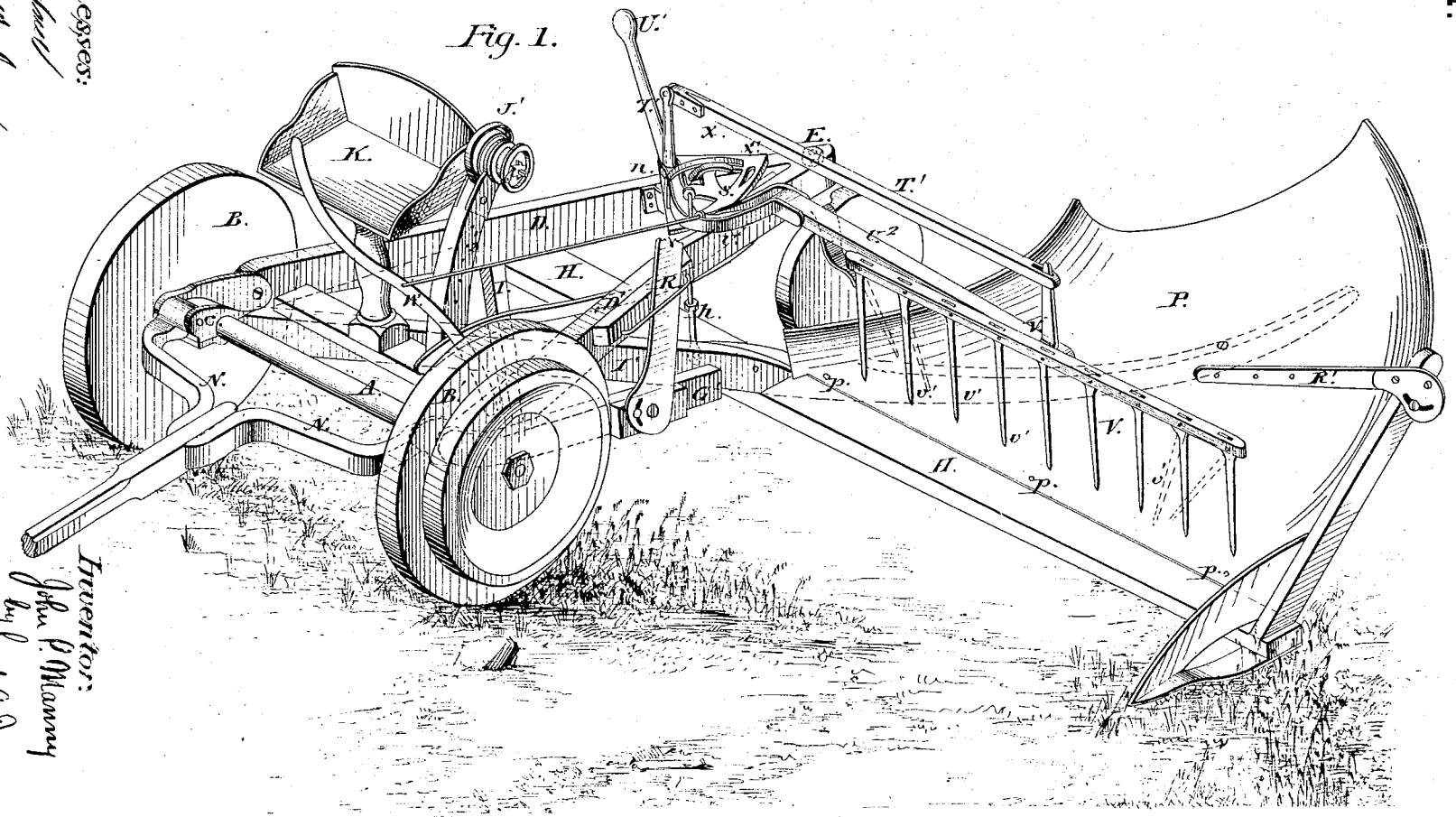

5 Sheets—Sheet 1.

J. P. MANNY.

HARVESTER.

No. 6,881. Reissued Jan. 25, 1876.

Witnesses:
M. Goodwin
Edw. W. Down

Inventor:
John P. Manny
by Saml. A. Duncan
Att'y.

J. P. MANNY.

HARVESTER.

No. 6,881. Reissued Jan. 25, 1876.

Witnesses:
M. Gardwell
Edw. W. Down

Inventor:
John P. Manny
by Saml. A. Duncan
Atty.

J. P. MANNY.
HARVESTER.
No. 6,881.
Reissued Jan. 25, 1876.
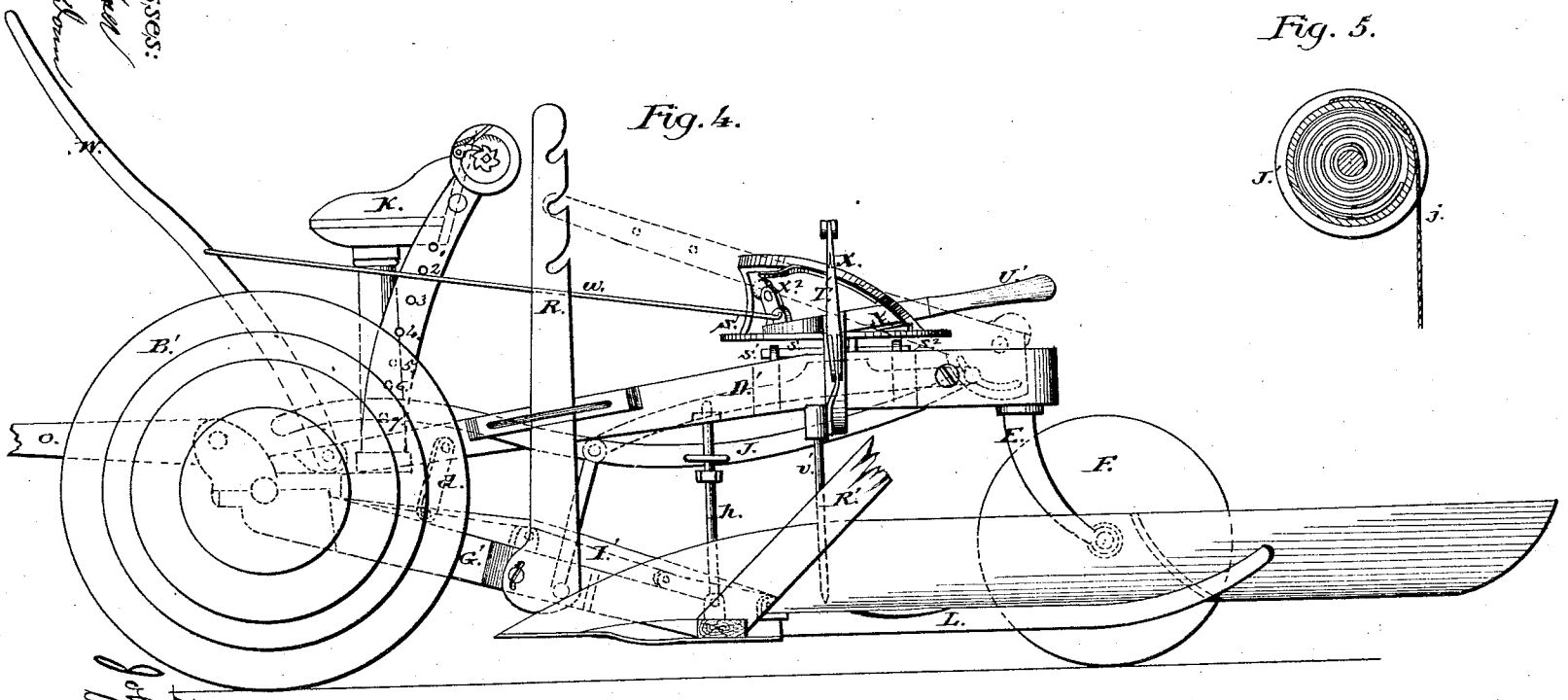
Witnesses:
Chas. W. Brown
Inventor:
John P. Manny
by Saml. A. Duncan
Atty.

J. P. MANNY.
HARVESTER.
No. 6,881.
Reissued Jan. 25, 1876.
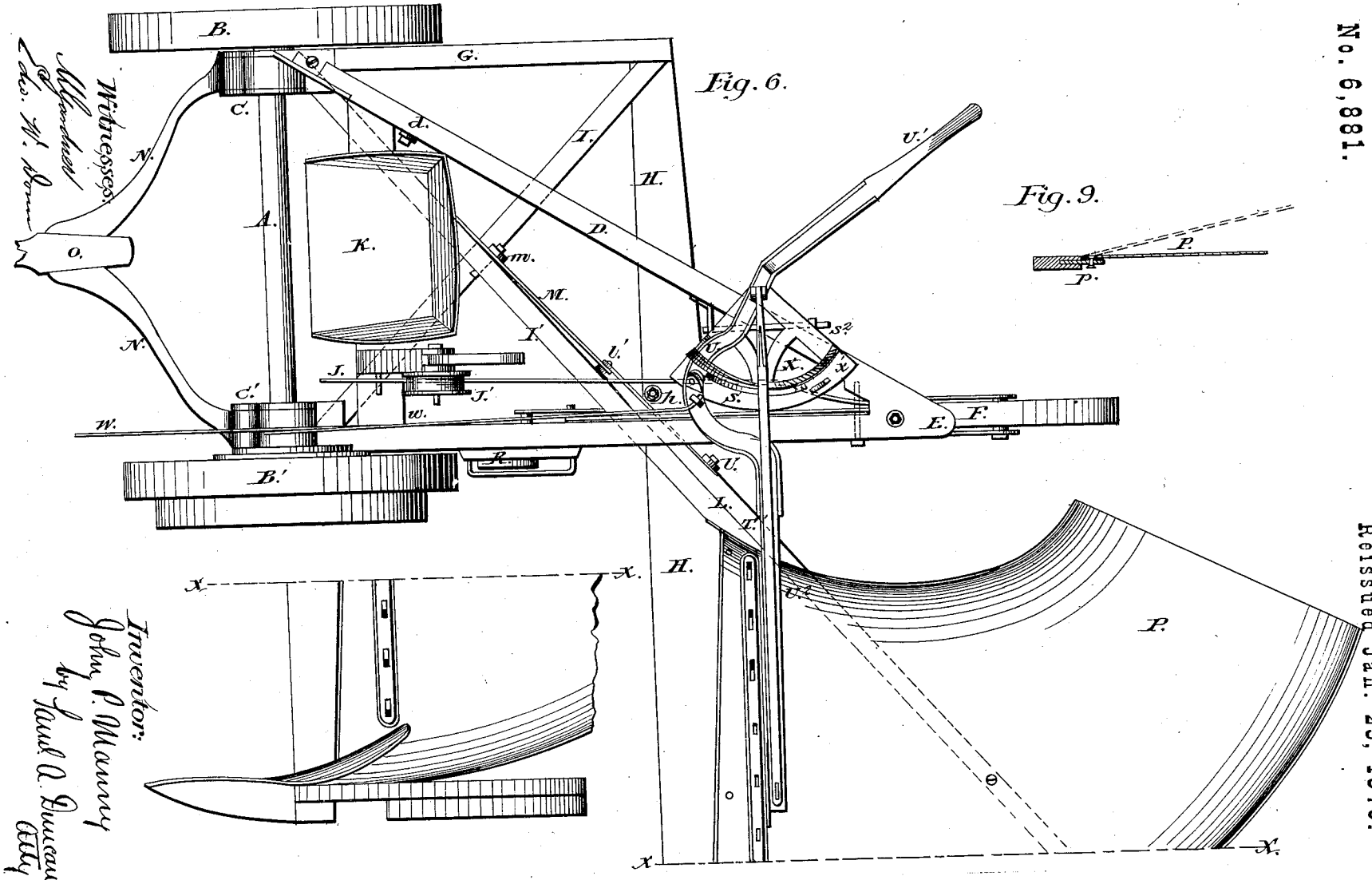

J. P. MANNY.

HARVESTER.

No. 6,881.

Reissued Jan. 25, 1876.

Witnesses:
M. Gandnell
Edw. W. Dorn

Inventor:
John P. Manny
by Saml. A. Duncan
Atty.

UNITED STATES PATENT OFFICE.

JOHN P. MANNY, OF ROCKFORD, ILLINOIS.

IMPROVEMENT IN HARVESTERS.

Specification forming part of Letters Patent No. 17,798, dated July 14, 1857; reissue No. 3,580, dated August 3, 1869; reissue No. 6,881, dated January 25, 1876; application filed January 12, 1876.

DIVISION C.

*To all whom it may concern:*

Be it known that I, JOHN P. MANNY, of Rockford, in the county of Winnebago and State of Illinois, have invented certain new and useful Improvements in Harvesters, of which the following is a full, clear, and exact description:

The invention herein claimed relates to a harvesting-machine when used as a reaper, and to that particular class of machines in which the cutting apparatus projects laterally from the path of the team, and in which the cut grain is removed from the grain-platform, which is located immediately behind the finger-beam, by means of a rake sweeping over the platform in a curved path, so as to deposit the gavels upon the stubble out of the way of the team upon its next round.

In such machines the rake, while sweeping off the grain, should move nearly or quite in contact with the surface of the platform, and upon leaving the same should be raised up and carried forward to the front of the platform through an elevated path entirely above the cut and the falling grain.

It is found in practice that this is best accomplished by mounting the rake upon the supporting standard or shaft, which forms its main axis of rotation, and also pivoting it upon a secondary axis arranged transversely to its length, and guiding its movements around the two centers or axes of motion thus provided by means of a cam-guide.

Experience further shows that a cam-guide employed for this purpose should be located at the stubble side, rather than at the grain side, of the platform. When thus located there will be less liability of its becoming clogged with the cut grain, and it can be far more conveniently constructed to give the requisite elevation to the rake on its forward movement.

This cam-guide, again, should be so constructed and arranged that while holding the rake down to its work in removing the gavels, and thus securing an effective side delivery, it will cause it to traverse such a path on its return movement as will leave an unobstructed space above the frame of the machine for a driver's seat.

By mounting the driver upon the machine he can regulate both the cutting and the raking mechanism, varying the elevation of the former, either for regulating the height of the cut or for passing obstructions, when the machine is provided with proper appliances therefor, and operating the latter with greater or less frequency, according to the condition of the standing crop; also, when mounted on the machine he has far better control of the team, is less liable to become fatigued, and his weight greatly aids in balancing the machine.

The object of the invention herein claimed is the production of a machine embodying the foregoing features of construction, in which both the raking mechanism and the cutting apparatus shall be brought in as close as possible to the base of the machine—that is, to the driving-wheels; and to this end it consists, in general terms, in placing the finger-beam and the platform in rear of the line of the driving-wheels, and in combining with these elements of the machine, when thus located, a sweep-rake, cam-guide, and driver's seat, constructed and arranged to operate substantially as above indicated.

It also consists in giving a vertical adjustability to the cutting apparatus, the grain-platform, and the raking mechanism, when thus located with reference to the driving-wheels and to each other, so that the height of the cutters may be varied, as required.

It also consists in providing, in connection with said elements of the machine, a flexible connection between the finger-beam and the carrying frame, so that the driver may vary the height of the cutters for passing obstructions, or as may be required by the condition of the crop, while the machine is in motion.

It will be readily understood that if the cutting apparatus were to be arranged on the plan of a front-cut harvester—*i. e.*, in front of the driving-wheels—it would become necessary, in order to use a sweep-rake capable of carrying the gavels around the driving-wheels so as to deliver them out of the way of the team on its next round, to set the heel of the cutters out laterally a considerable distance from the driving-wheels. This necessarily increases the width of the machine, and adds correspondingly to the side draft.

This difficulty is specially prominent in so-called two-wheeled machines, or machines which have two main wheels at the stubble side of the platform, and a carrying-frame, from which the finger-beam is suspended, on account of the large space occupied by such wheels and frame.

In a rear-cut harvester, on the other hand, in which the finger-beam is arranged behind the line of the driving-wheels, there is more space for the mounting and operating of a sweep-rake. Consequently the heel of the cutters can be brought in much nearer to the track of the driving-wheels, and thus the machine be made more compact, with a corresponding diminution of side draft.

In order that my invention as herein claimed may be fully understood, I have represented in the accompanying drawings, and will proceed to describe, the principal parts of a machine in which I have embodied it, the parts omitted from the drawings being such as are well understood by builders of harvesters, and the parts shown in the drawings, but not described in the specification, being either parts well known in the art or parts that form the subject-matter of other divisions, by reissue, of the patent (No. 17,798) granted me July 14, 1857.

Figures 2, 3:
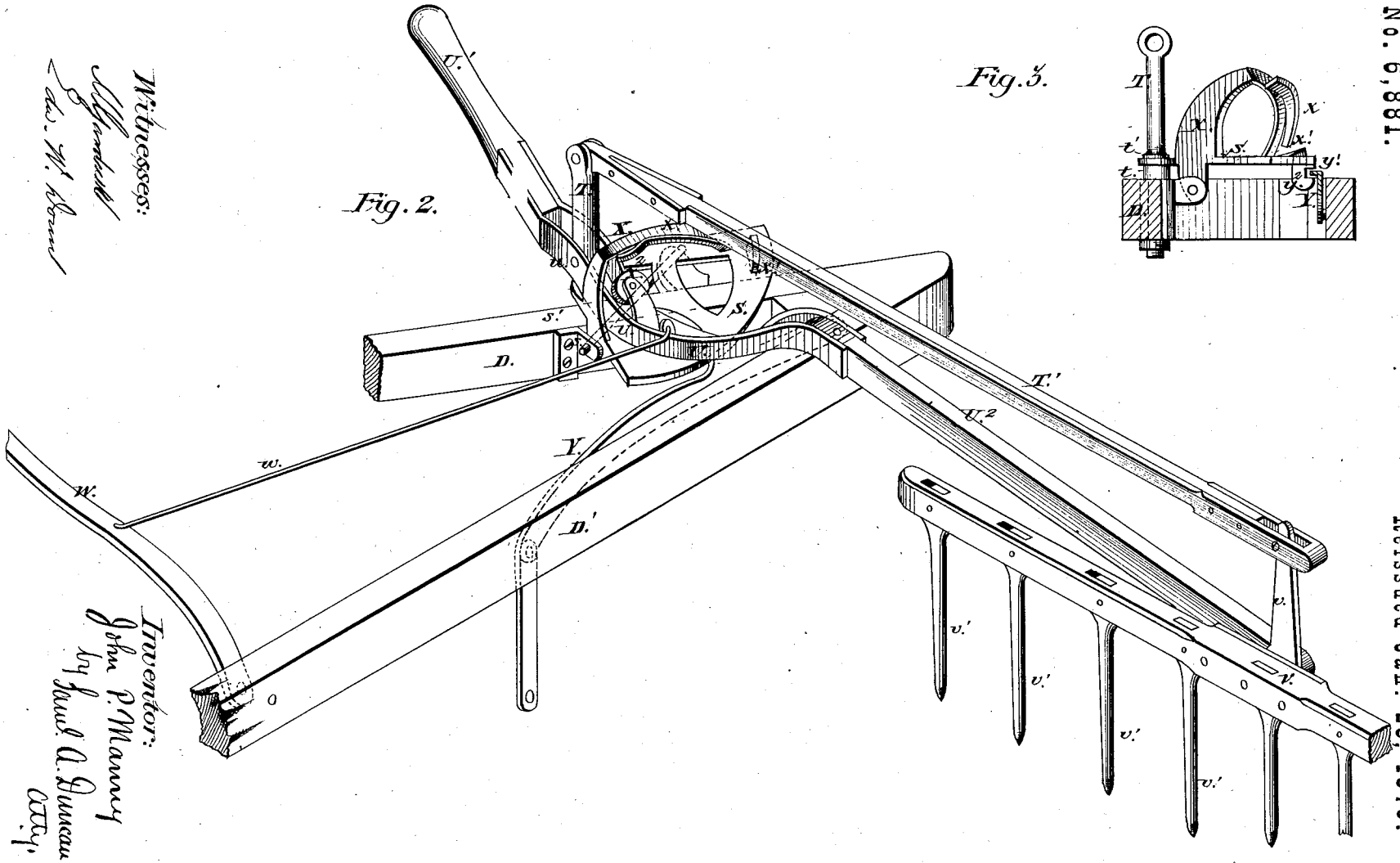
Figure 8:
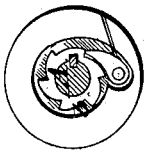
Figure 7:
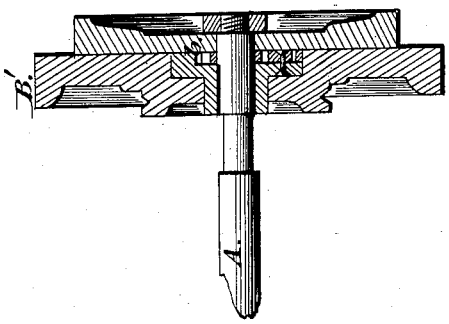
Figure 10:
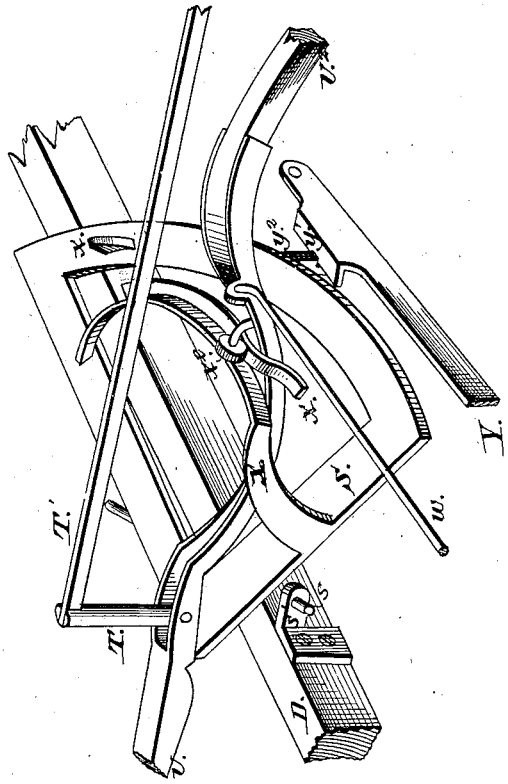

Figure 1 is a perspective view of the machine as seen from the divider side. Fig. 2 is a similar view, on an enlarged scale, of the raking mechanism. Fig. 3 is a view, in elevation, of the rake-supporting devices detached, and seen from the front. Fig. 4 is a view, in elevation, of the machine as seen from the divider side. Fig. 5 is a vertical section through the lifting-drum. Fig. 6 is a plan or top view of the machine. Fig. 7 is a vertical transverse section through the inner driving-wheel. Fig. 8 represents one of the backing-ratchets. Fig. 9 is a vertical section through the platform, on the line *x x* of Fig. 6. Fig. 10 is an enlarged perspective view of the cam-guide and its connected parts.

In the machine here illustrated as embodying, in its aggregate structure, the specific improvements to which this patent relates, it will be seen that there is a main carrying-frame, supporting a driver's seat, a supplemental frame, connected therewith by a hinge-connection, so as to be vertically adjustable relatively thereto, a finger-beam attached to the rear of such supplemental frame, and projecting laterally from the path of the main wheels and of the team, and in a line behind the driving-wheels, a sweep-rake, located on the stubble side of the platform, and pivoted so as to move in a curved path, and a grain-platform attached directly to the finger-beam, and having its inner or grain side curved round toward the rear of the main frame.

Referring to the drawings, D D′ is the main frame of the machine, connected with the axle of the driving-wheels by the boxes C C′, and having the driver's seat K mounted upon in a convenient position. H is the finge beam, projecting laterally from the path the team. P is a grain-platform, located in mediately behind the finger-beam, and curv ing inward toward the rear of the machine and V is a rake, supported on the radia arm $U^2$.

This rake-arm, through the medium of th shank U, is attached to the post or shaft T which constitutes an axis of rotation aroun which it turns. It is also pivoted at *u* trans versely to the axis of rotation; and by thu giving it motion around two transverse cen ters or axes, it follows that the rake may b caused to move forward or rearward, and t rise or to fall at pleasure.

Near the rake-post is placed a cam-guide by means of which the vertical movements o the rake, while in operation, are controlled automatically. This cam-guide consists of a supporting-frame, S X, and a flange, rib, o ledge, *x*, projecting out from the face thereof. A principal office of this ledge or rib *x* is to control the path of the rake when it is moving forward to the front of the platform. It does this through the medium of a lug or stud, *n*, projecting from the shank that supports and carries the rake-arm. This stud is so constructed as to overhang the flange or rib *x*, which thus serves as a cam-track to lift the rake whenever the end of the stud rests upon the upper surface of the track.

In order to diminish friction, the end of the stud *m* is provided with a friction-roller, $x^2$.

The forward end of the cam-track is shown as slightly bent downward. This is to permit the rake-head to pass in under the reel-bats when the rake is operated in connection with a reel revolving around a horizontal axis. As the rake descends from the cam-track *x* and moves rearward over the platform, it is prevented from falling into the cutters and from dragging too heavily upon the platform, by means of the lower part S of the cam-frame, which supports the rake and guides it in a plane substantially parallel with the platform. At the same time the rake is held down to its work by means of the stud projecting from the rake-shank, which would strike against the under side of the flange *x* if the rake should begin to rise.

As the rake moves rearward in delivering the gavel, the stud *n* passes out from under the lower end of the cam-track or ledge *x*, and on its return movement the roller $x^2$ mounts said track, and thus caries the rake up through an elevated path.

By an inspection of the drawings it will be seen that the raised part of the cam-guide forms an angle with that part which supports the rake on its horizontal movement. This angle is to be made large enough to carry the rake in its forward movement clear of the cut and the falling grain. At the same time it should not be so large as to cause the rake to sweep around over the frame of the machine, and interfere with the driver riding on his seat.

Two modes of actuating the rake are shown, one being the short handle $U^1$, inserted in the heel of the shank U, and the other being the lever W, placed near the driver's seat, and connected with the shank of the rake-arm by means of the rod *w*. This lever enables the driver from his seat to control the frequency of the movements of the rake, according to the thickness or thinness of the crop.

Reel-supports R R′ are provided for holding the shaft of an ordinary gathering-reel, said shaft being driven by a pulley attached to the face of the driving-wheel B′. These supports are pivoted at their lower end, and are provided with slots and set-screws, so that they can be adjusted forward and backward, as occasion may require. Also, they are so connected with the finger-beam as to partake of its up-and-down movements, and thus the reel, the finger-beam, and the platform rise and fall simultaneously.

In order that the finger-beam, the reel-supports, and the grain-platform may all be raised and lowered simultaneously, relatively to the ground and to the carrying-frame, the finger-beam is connected with the carrying-frame by a hinge-connection.

The hinge-connection in the machine shown in the drawings is formed at the points where the upper frame is pivoted to the boxes G C′. As the lower frame, which consists of the bars G G′ and the diagonal braces I I′, is attached at its upper end to these same boxes, and the finger-beam is attached to the lower end of this lower frame, this construction permits the finger-beam to be adjusted vertically relatively to the carrying-frame, as described.

The inner reel support, as shown in the drawings, is connected with the finger-beam through the intervention of the bar G′, and the outer reel-support through the intervention of a post secured to the divider end of the finger-beam.

The grain-platform is secured to the finger-beam by means of hinges *p*, and thus, whenever the finger-beam is raised or lowered, relatively to the upper carrying-frame, through the hinge-connection which unites the two, the reel-supports and the platform, being attached to, or connected with, the finger-beam, are raised or lowered to the same extent.

The relative adjustment of the rake and the platform is maintained under all the varying elevations of the latter, by means of the cam-guide S X, in the following manner: The cam-guide, instead of being made fast to the carrying-frame, is pivoted to one of the bars thereof by means of the pin or rod *s*, which rests in the boxes $s^1$ $s^2$.

The inner end of the guide is provided with a fork, which embraces the rake-standard T between the two fixed collars *t*.

As the rake-arm is pivoted horizontally at *u* to the standard T, which is free to turn upon its axis, and also to move up and down in its bearing, and as the rake-arm is further supported upon the upper face of the cam-guide, it follows that, whenever the cam-guide is rocked upon the pin or shaft *s*, the vertical position of the outer end of the rake-arm, and thus also the vertical position of the rake-head, will be correspondingly changed.

The cam-guide is caused to rock automatically upon its shaft by means of the lever Y, pivoted to the bar D′ of the carrying-frame, and the slotted stud $y^2$ upon the under side of the cam-guide. A horizontal flange, $y^1$, upon the lever Y takes loosely into the slot in the stud $y^2$, while the forward end of the lever Y is connected with the lower or adjustable frame of the machine by means of a pivoted rod or link.

Thus, whenever the finger-beam, to which the platform is attached, is raised or lowered, the cam-guide is automatically rocked upon its shaft, and the elevation of the rake, which is controlled by the cam-guide, is changed simultaneously, and to a corresponding extent.

In order to maintain the parallelism of the rake when it is raised and lowered, the rake-head is connected by a pivot with the rake-arm $U^2$, and is provided with an upright arm, *v*, which is connected by a radius-bar, T′, and pivots with the upper end of the rake-shaft T.

As the radius-bar is of the same length as the rake-arm from its pivot to the pivot of the rake-head, and as the upright arm *v* is of the same length as the length of the rake-shaft between the pivot of the rake-arm and the pivot of the radius-bar, the rake-head is caused to maintain its parallelism with the platform when sweeping over the latter, notwithstanding it is raised or lowered simultaneously with the raising and lowering of the finger-beam.

In order that the finger-beam, the grain-platform, and the connected parts may be suspended from the carrying frame, a suspension device, *h*, is provided, which is connected at its lower end with the finger-beam, and at its upper end with the carrying-frame; and in order that the same device may be used to raise and lower the finger-beam and the parts connected therewith, its upper end is connected with the carrying-frame through the intervention of a lifting-lever, J.

This lever is pivoted at its rear end to the carrying-frame, while its front end passes forward within reach of the driver on the seat K, so that he is enabled from his seat to raise and lower the finger-beam and the platform, and the other parts connected therewith.

The finger-beam and connected members may be temporarily secured at any particular elevation to which they may be raised by means of a standard arranged at the side of the driver's seat, and provided with a series of holes for the insertion of a retaining pin under the lifting-lever, the front end of which traverses alongside the standard.

The effective length of the suspension device may be varied, if required, by means of a nut screwed upon its upper end, above the eye upon the lifting-lever, through which it passes.

A second nut arranged upon this suspension device below the lifting-lever serves as a collar, against which the lever may be made to bear whenever the driver finds it necessary to press down upon the cutting apparatus to hold it to the ground.

The horizontality of the platform during the vertical oscillations of the finger-beam is maintained by means of a lever, L, and its connections.

This lever is pivoted to the finger-beam at *l*, and is connected at its forward end *l'* with one end of a second lever, M, which is pivoted to one of the diagonal braces of the lower adjustable frame, and has its other end connected with the upper carrying-frame by means of the link *d*.

As the lever L reaches under and is attached to the platform, and the platform is connected with the finger-beam by hinges, this construction causes the platform to turn slightly upon its hinges as the finger-beam rises and falls, and thus its horizontality is preserved.

In the machine shown in the drawings, the grain-platform is not only curved to conform to the circular sweep of the rake, but it is contracted at its delivery side, so as to condense the gavel before it is discharged upon the stubble.

The rake is also specially adapted for operation in connection with such a platform by having the outer teeth pivoted so as to swing laterally in the plane of the rake-head, by which means the teeth are pressed toward each other by the converging sides of the platform as the rake moves toward the delivery side, but return again to their vertical position as the rake lifts up on its forward movement.

In order to prevent the rake from dragging or scattering the gavel when it is discharged upon the stubble, a sharp incline, $x^1$, is formed upon the lower track of the cam-guide at its rear end; the position of this incline in relation to the delivery side of the platform being such that the moment the gavel is lodged upon the stubble the rake-arm is brought in contact with the face of the incline, by which means the rake itself is thrown suddenly upward, and entirely disengaged from the grain of the gavel.

The machine is drawn forward by means of the tongue O, which connects with the main frame of the machine by the hounds N N, pivoted to the boxes C C'.

The object of thus making a hinge-connection between the pole and the carrying-frame, which, by consequence, has to be provided with a caster-wheel support at the rear, is to relieve the horses' necks, as far as possible, from the shock and strain that are apt to occur when the carrying-frame and pole are rigidly connected. It will be readily understood, however, that my invention in nowise relates to the mode in which these two parts are connected.

Various essential elements of a harvesting-machine, such as the cutters, the gearing, and other members, are not exhibited in the accompanying drawings, since the invention in no way relates to these omitted parts, and their construction is well understood by the builders of this class of machines.

What is claimed as new is—

1. The combination, in a harvester, of a driver's seat, a finger-beam, and platform, projecting laterally from the path of the team behind the line of the driving-wheels, a rake moving over such platform in a curved path, so as to deliver the gavels out of the way of the team on its next round, and a cam-guide located on the same side of the platform as the driver's seat, by means of which the rake, on its return movement, is caused to traverse an elevated path, clear of the grain on the platform, and without interfering with the driver on his seat.

2. The combination, in a rear-cut harvester, of two supporting-wheels mounted on the main axle, a carrying-frame supporting a driver's seat, a laterally-projecting finger-beam vertically adjustable relatively to the carrying-frame, a grain-platform attached to the finger-beam, and a sweep-rake moving over the platform in a curved path, the parts being constructed and arranged so that the rake will partake of the vertical movements of the platform and will deliver the gavels out of the way of the team on its next round.

3. The combination, in a rear-cut harvester, of two supporting-wheels mounted on the main axle, a carrying-frame supporting a driver's seat, a laterally-projecting finger-beam and platform flexibly connected with the carrying-frame, so as to be vertically adjustable relatively thereto, and a sweep-rake moving over such platform in a curved path, the parts being so combined and arranged that the gavels will be delivered out of the way of the team on its next round, while the driver, from his seat, can vary the elevation of the finger-beam, whether for regulating the height of cut or for passing obstructions.

JOHN P. MANNY.

Witnesses:

THOMAS C. CONNOLLY,
SAML. A. DUNCAN.